(12) United States Patent
O'Flarity

(10) Patent No.: US 10,107,500 B2
(45) Date of Patent: Oct. 23, 2018

(54) GAS TURBINE ENGINE WITH SELECTIVE FLOW PATH

(71) Applicant: United Technologies Corporation, Hartford, CT (US)

(72) Inventor: Steven M. O'Flarity, Glastonbury, CT (US)

(73) Assignee: UNITED TECHNOLOGIES CORPORATION, Farmington, CA (US)

( * ) Notice: Subject to any disclaimer, the term of this patent is extended or adjusted under 35 U.S.C. 154(b) by 735 days.

(21) Appl. No.: 14/713,187

(22) Filed: May 15, 2015

(65) Prior Publication Data

US 2016/0377295 A1   Dec. 29, 2016

Related U.S. Application Data

(60) Provisional application No. 62/001,882, filed on May 22, 2014.

(51) Int. Cl.
  *F23R 3/42* (2006.01)
  *F02K 1/80* (2006.01)
  (Continued)

(52) U.S. Cl.
  CPC .............. *F23R 3/42* (2013.01); *F02C 3/04* (2013.01); *F02C 3/107* (2013.01); *F02C 7/36* (2013.01);
  (Continued)

(58) Field of Classification Search
  CPC .... F02C 7/36; F02C 3/13; F02C 3/107; F02C 3/10; F05D 2250/314; F05D 2250/313;
  (Continued)

(56) References Cited

U.S. PATENT DOCUMENTS 3,054,577 A    9/1962  Wolf et al.
3,122,343 A *  2/1964  Leibach .............. B64C 29/0025
                                                244/23 B
(Continued)

OTHER PUBLICATIONS

International Search & Written Opinion for PCT/US2013/026576 completed on Jun. 24, 2013.

(Continued)

*Primary Examiner* — Carlos A Rivera
*Assistant Examiner* — Marcos O Diaz
(74) *Attorney, Agent, or Firm* — Carlson, Gaskey & Olds, P.C.

(57) ABSTRACT

A gas turbine engine includes a gas generator with at least one compressor rotor, at least one gas generator turbine rotor and a combustion section. There is a duct located downstream of the gas generator. The duct is configured to move between a first position and a second position. A fan drive turbine is positioned downstream of a path of the products of combustion and passes over at least one gas generator turbine rotor when the duct is in the first position. The fan drive turbine is for driving a shaft and the shaft is for engaging gears to drive at least two fan rotors. An augmentor section is positioned downstream of a path of products of combustion and passes over at least one gas generator turbine rotor when the duct is in second position.

12 Claims, 5 Drawing Sheets

(51) Int. Cl.
*F02K 3/04* (2006.01)
*F02K 3/077* (2006.01)
*F02K 3/10* (2006.01)
*F02C 3/107* (2006.01)
*F02C 3/04* (2006.01)
*F02C 7/36* (2006.01)

(52) U.S. Cl.
CPC ............... *F02K 1/80* (2013.01); *F02K 3/04* (2013.01); *F02K 3/077* (2013.01); *F02K 3/10* (2013.01); *F05D 2240/40* (2013.01); *F05D 2260/4031* (2013.01)

(58) Field of Classification Search
CPC ...... F05D 2250/312; F02K 1/004; F02K 1/78; F02K 3/068; F02K 3/065; F02K 3/04; F02K 3/062; F02K 3/075; F02K 3/077; F02K 3/12; F02K 3/10
See application file for complete search history.

(56) References Cited

U.S. PATENT DOCUMENTS

| | | | |
|---|---|---|---|
| 5,161,369 A | 11/1992 | Williams | |
| 5,246,188 A * | 9/1993 | Koutsoupidis | B64C 27/26 244/12.3 |
| 5,617,717 A * | 4/1997 | Asquith | F02C 7/262 219/121.48 |
| 5,996,935 A | 12/1999 | Snell | |
| 6,260,800 B1 * | 7/2001 | Snell | B64C 3/50 244/53 R |
| 6,792,745 B2 | 9/2004 | Wojciechowski | |
| 7,107,756 B2 | 9/2006 | Rolt | |
| 7,752,834 B2 | 7/2010 | Addis | |
| 8,015,796 B2 | 9/2011 | Babu et al. | |
| 2002/0189230 A1 | 12/2002 | Franchet et al. | |
| 2004/0025493 A1 | 2/2004 | Wojciechowski | |
| 2008/0098719 A1 | 5/2008 | Addis | |
| 2009/0229243 A1 | 9/2009 | Guemmer | |
| 2012/0128487 A1 * | 5/2012 | Eames | B64C 11/346 416/1 |
| 2013/0223991 A1 | 8/2013 | Suciu et al. | |

OTHER PUBLICATIONS

International Preliminary Report on Patentability for Application No. PCT/US2013/026576 dated Sep. 12, 2014.
Extended European Search Report for European Application No. 15168223.4, dated Oct. 19, 2015.

* cited by examiner

GAS TURBINE ENGINE WITH SELECTIVE FLOW PATH

CROSS-REFERENCE TO RELATED APPLICATIONS

This application also claims priority to U.S. Provisional Patent Application Nos. 62/001,882, filed on May 22, 2014

BACKGROUND OF THE INVENTION

Gas turbine engines are known and typically include a fan delivering air as bypass air into a bypass housing and further delivering air into a core engine. Air in the core engine is directed into a compressor where it is compressed. The compressed air is then delivered into a combustion section where it is mixed with fuel and ignited. Products of this combustion pass downstream over turbine rotors, driving them to rotate.

Recently, it has been proposed to increase the diameter of the fan to, in turn, increase bypass ratios, or the volume of air delivered as bypass or propulsion air compared to the volume of air delivered into the core engine. However, the ability to make this increase is somewhat limited by the packaging envelope available on an aircraft.

It has been proposed to replace a single large diameter with a plurality of fan rotors. However, the proposals for driving the plurality of fan rotors have deficiencies in general.

SUMMARY OF THE INVENTION

In one exemplary embodiment, a gas turbine engine includes a gas generator with at least one compressor rotor, at least one gas generator turbine rotor and a combustion section. There is a duct located downstream of the gas generator. The duct is configured to move between a first position and a second position. A fan drive turbine is positioned downstream of a path of the products of combustion and passes over at least one gas generator turbine rotor when the duct is in the first position. The fan drive turbine is for driving a shaft and the shaft is for engaging gears to drive at least two fan rotors. An augmentor section is positioned downstream of a path of products of combustion and passes over at least one gas generator turbine rotor when the duct is in second position.

In a further embodiment of the above, the duct is a three bearing swivel duct.

In a further embodiment of any of the above, the augmentor section includes at least one spray bar for injecting fuel into an exhaust stream.

In a further embodiment of any of the above, the augmentor section includes an igniter for igniting fuel injected into the exhaust stream.

In a further embodiment of any of the above, at least two fan rotors include a variable inlet opening.

In a further embodiment of any of the above, at least two fan rotors include a variable exhaust opening.

In a further embodiment of any of the above, the duct includes a first exit flow path when in first position and a second exit flow path when in second position. The first exit flow path is generally perpendicular to the second exit flow path.

In a further embodiment of any of the above, the gas generator includes at least two compressor rotors and at least two gas generator turbine rotors. The fan drive turbine is positioned to be downstream of a path of the products of combustion and passes over each of at least two gas generator turbine rotors.

In a further embodiment of any of the above, an axis of rotation of the gas generator is generally perpendicular to an axis of rotation of the shaft.

In a further embodiment of any of the above, an axis of rotation of the gas generator is generally coaxial with an axis of rotation of at least two fan rotors.

In another exemplary embodiment, a method of operating a gas turbine engine includes generating a flow of combustion products from a gas turbine generator, orienting a duct in a first position to direct the flow of combustion products having passed over at least one gas generator turbine rotor through a fan drive turbine in response to a first desired flight condition and orienting the duct in a second position to direct the flow of combustion products having passed over at least one gas generator turbine rotor through an augmentor section in response to a second desired flight condition.

In a further embodiment of the above, the gas generator includes at least one compressor rotor, at least one gas generator turbine rotor and a combustion section.

In a further embodiment of any of the above, the first desired flight condition is subsonic flight.

In a further embodiment of any of the above, the second desired flight condition is supersonic flight.

In a further embodiment of any of the above, the flow of combustion products passes over at least one gas generator turbine rotor prior to entering the duct.

In a further embodiment of any of the above, the fan drive turbine drives a shaft and the shaft engaging gears to drive at least two fan rotors.

In a further embodiment of any of the above, at least two fan rotors include a variable inlet and a variable outlet. The variable inlet and the variable outlet are in an open position when the duct is in the first position and in a closed position when the duct is in said second position.

In a further embodiment of any of the above, the augmentor section includes a variable exhaust. The variable exhaust is in a closed position when the duct is in the first position and in an open position when the duct is in the second position.

DETAILED DESCRIPTION

Figure 1:
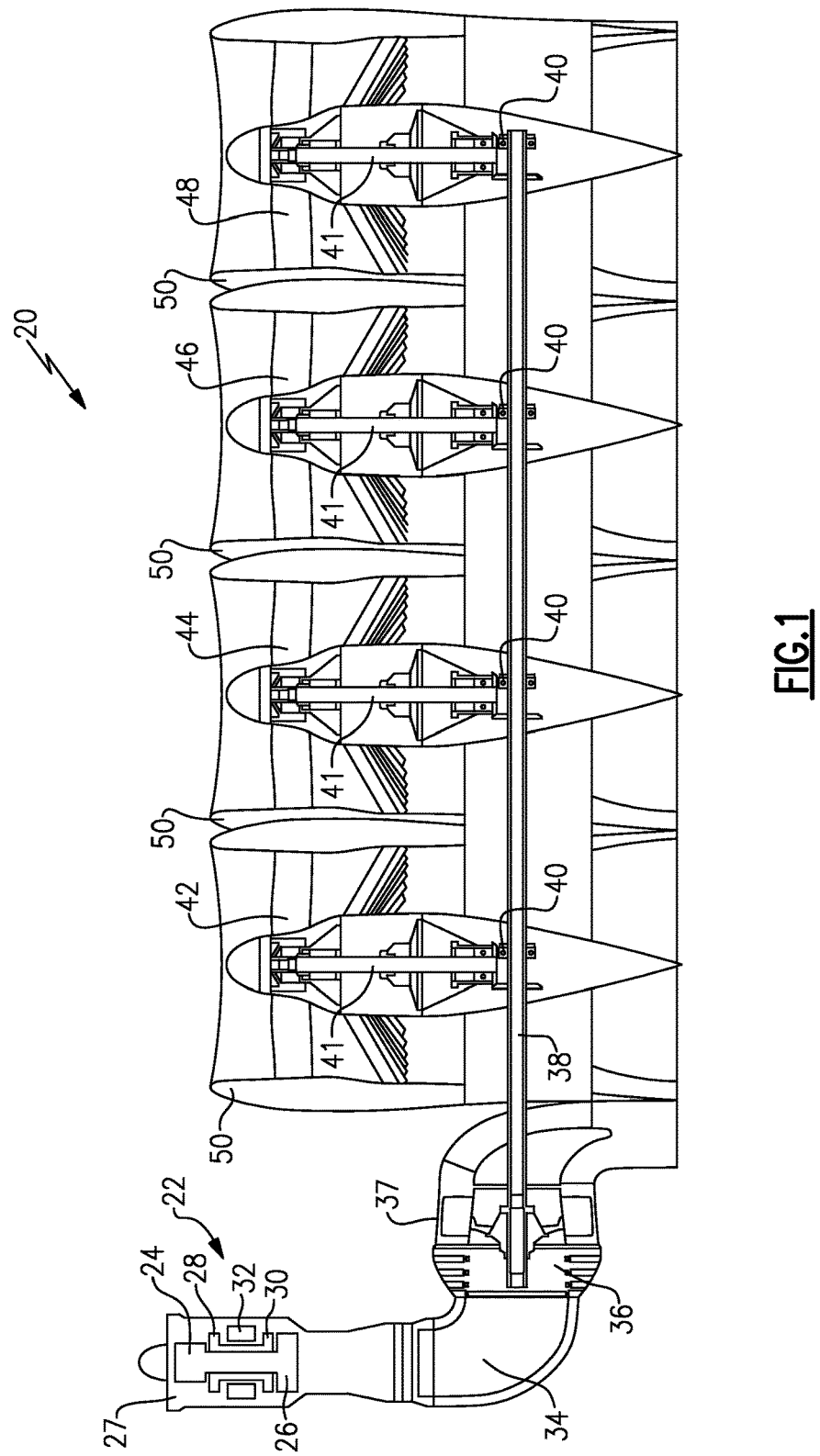
FIG. 1 schematically shows a gas turbine engine.

A gas turbine engine 20 is illustrated in FIG. 1 having a gas generator 22. The gas generator 22 may be a two spool gas generator having a low speed spool in which a first upstream compressor rotor 24 driven by a downstream or low pressure turbine rotor 26. A high speed spool includes a high pressure compressor rotor 28 rotating with a high pressure or upstream turbine rotor 30. A combustion section 32 is positioned intermediate rotors 28 and 30.

An exhaust duct 34 is positioned downstream of the gas generator 22 and receives products of combustion which have driven the turbine rotor 26 to rotate. These products of combustion pass across a fan drive turbine 36 mounted in a housing 37. The fan drive turbine 36 drives a single shaft 38 that engages a plurality of bevel gears 40 to, in turn, drive shafts 41 associated with fan rotors 42, 44, 46 and 48. Each of the fan rotors 42, 44, 46 and 48 are mounted within separate housings 50.

By providing the single shaft 38, which drives at least four fan rotors and by utilizing a fan drive turbine 36 which is positioned downstream of the last turbine rotor 26 in the gas generator 22, this disclosure provides compact packaging, while still providing adequate drive for the fan rotors 42, 44, 46 and 48.

Figure 2:
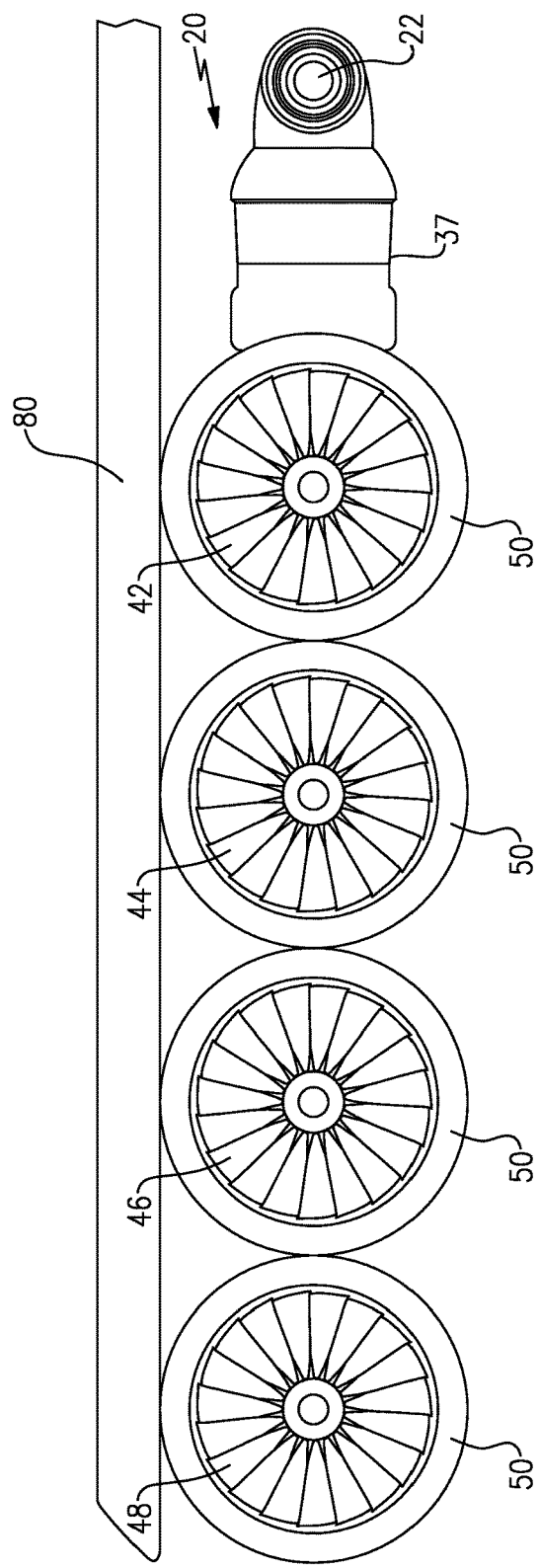
FIG. 2 is a front view of the FIG. 1 engine.

FIG. 2 is a front view of an aircraft wing 80, which may mount an engine such as engine 20. As shown, the gas generator is associated with the housing 37. The fan rotors 42, 44, 46 and 48 have diameters that are not unduly large, such that they fit within the packaging window of associated wing 80.

The basic engine as described above is disclosed in co-pending U.S. Patent Application Ser. No. 61/989,675, entitled "Gas Turbine Engine With Distributed Fans," filed on May 7, 2014. This basic fan structure can be incorporated into a gas turbine engine arrangement having one or more gas generators, and paired sets of the distributed fan.

Figure 3:
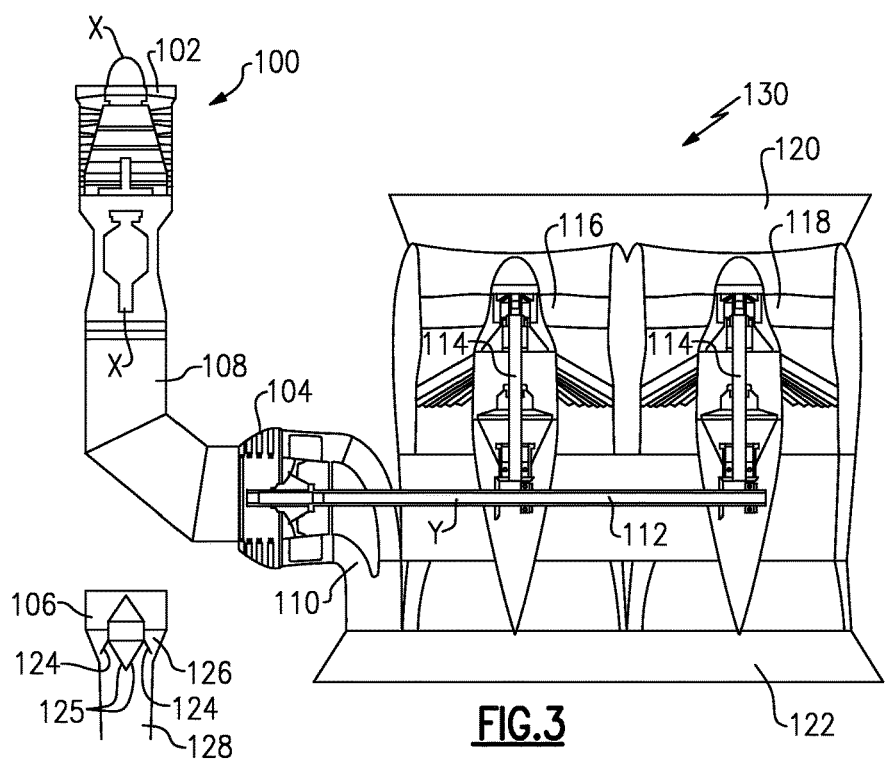
FIG. 3 shows a first embodiment in a first configuration.
Figure 4:
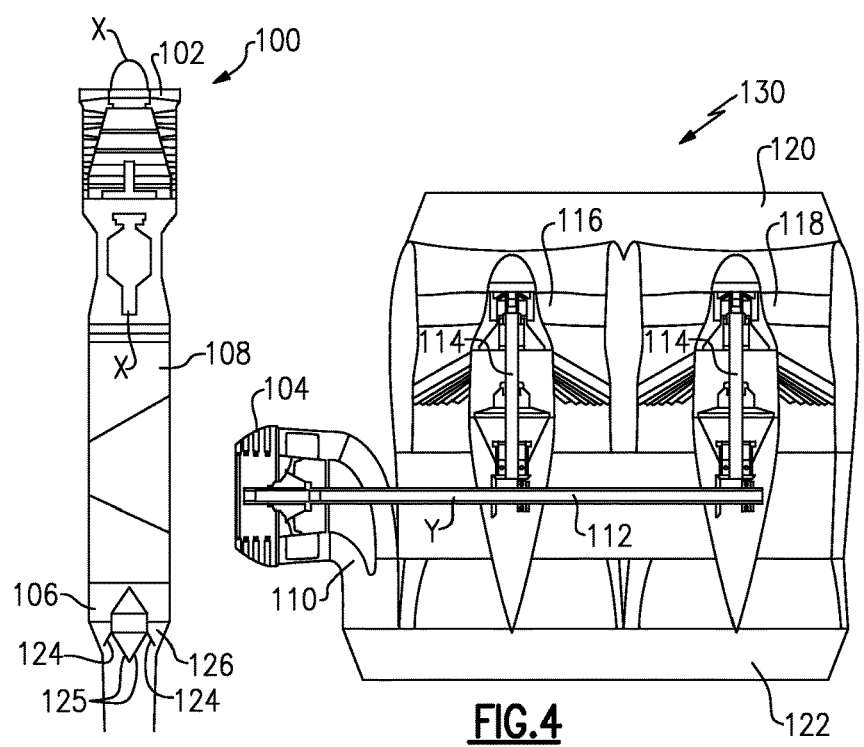
FIG. 4 shows the first embodiment in a second configuration.

As shown in FIGS. 3 and 4, a fan set 130 includes an engine 100 having a gas generator 102 for driving a fan drive turbine 104 or an augmentor 106. Products of combustion from the gas generator 102 are directed to the fan drive turbine 104 or the augmentor 106 by a moveable duct 108. An exhaust path when the moveable duct 108 is directed to the fan drive turbine 104 is generally perpendicular to an exhaust path when the moveable duct 108 is directed to the augmentor 106. In this embodiment, the moveable duct 108 is a three bearing swivel duct. However, other ducts capable of directing the products of combustion from the gas generator 102 to the fan drive turbine 104 and the augmentor 106 could be used.

When the gas generator 102 is used to drive the fan drive turbine 104 as shown in FIG. 3, products of combustion from the gas generator 102 pass into an exhaust duct 110. A shaft 112 rotates about an axis Y, while the gas generator 102 rotates about an axis X. The axis X is generally perpendicular to the axis Y. Shafts 114 are driven by shaft 112 to turn fan rotors 116 and 118. The shafts 114 extend in a direction generally parallel to the axis X and perpendicular to the axis Y. Although the shaft 112 is shown turning two separate rotors 116 and 118, additional rotors could be turned by the shaft 112.

A variable inlet 120 surrounds an inlet to the rotors 116 and 118 and a variable outlet 122 surrounds an outlet of the rotors 116 and 118 and the exhaust duct 110. When the moveable duct 108 engages the drive turbine 104 to turn the rotors 116 and 118, the variable inlet 120 and the variable outlet 122 are in an open position and an augmentor outlet 128 is in a closed position to reduce drag.

When the gas generator 102 is used to drive the augmentor 106, the augmentor outlet 128 is opened and products of combustion from the gas generator 102 pass into an augmentor duct 126. The variable inlet 120 and the variable outlet 122 close to reduce drag.

Fuel spray rails 124 extend into the flow path formed by the augmentor duct 126 to inject fuel which is ignited by an igniter 125 to produce an afterburner effect from the augmentor 106.

Figure 5:
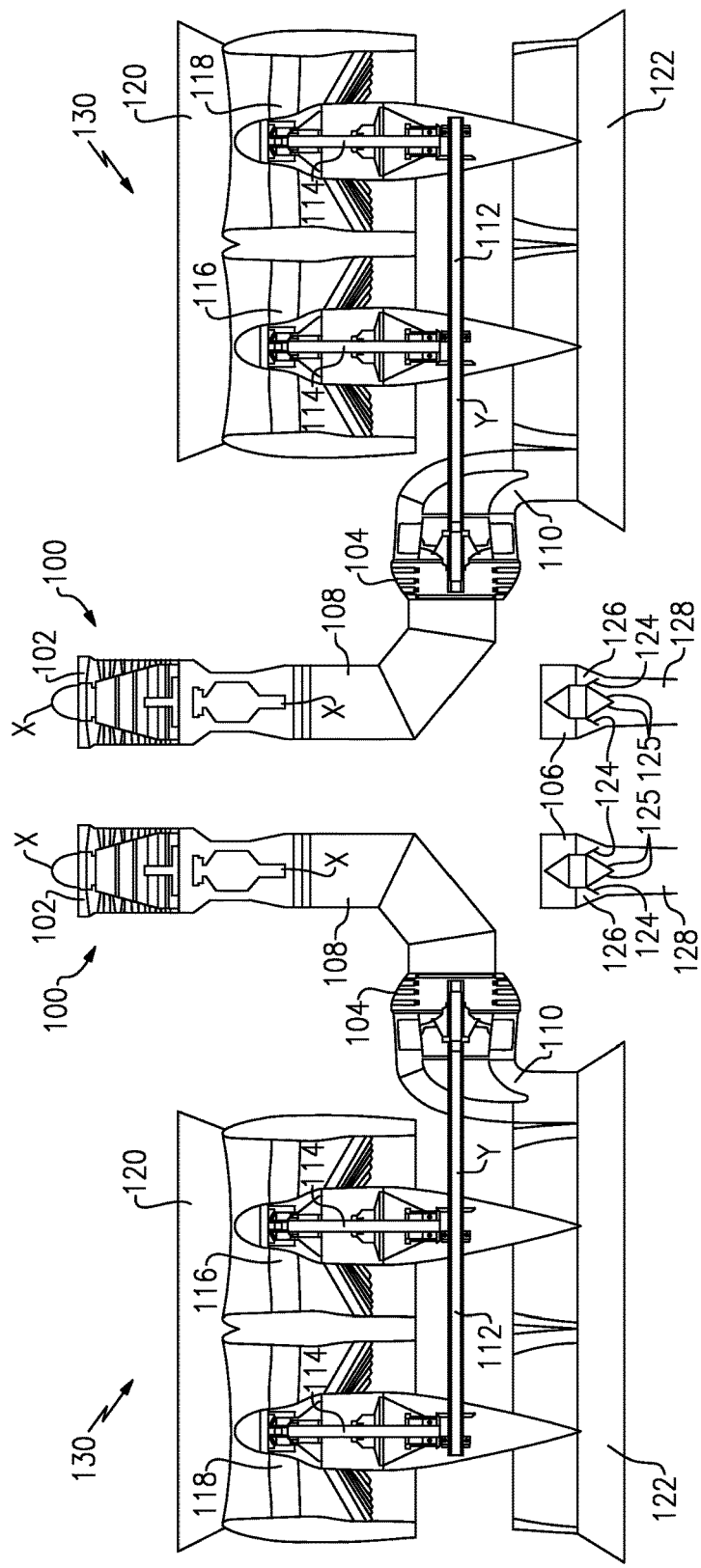
FIG. 5 shows a dual configuration of FIG. 3.

FIG. 5 shows an arrangement using the two fan sets 130 with the moveable duct oriented to drive the fan drive turbine 104. Utilizing the two fan sets 130 in this orientation creates a higher propulsive efficiency with lower fuel consumption and exhaust temperatures for long range cruise situations.

Figure 6:
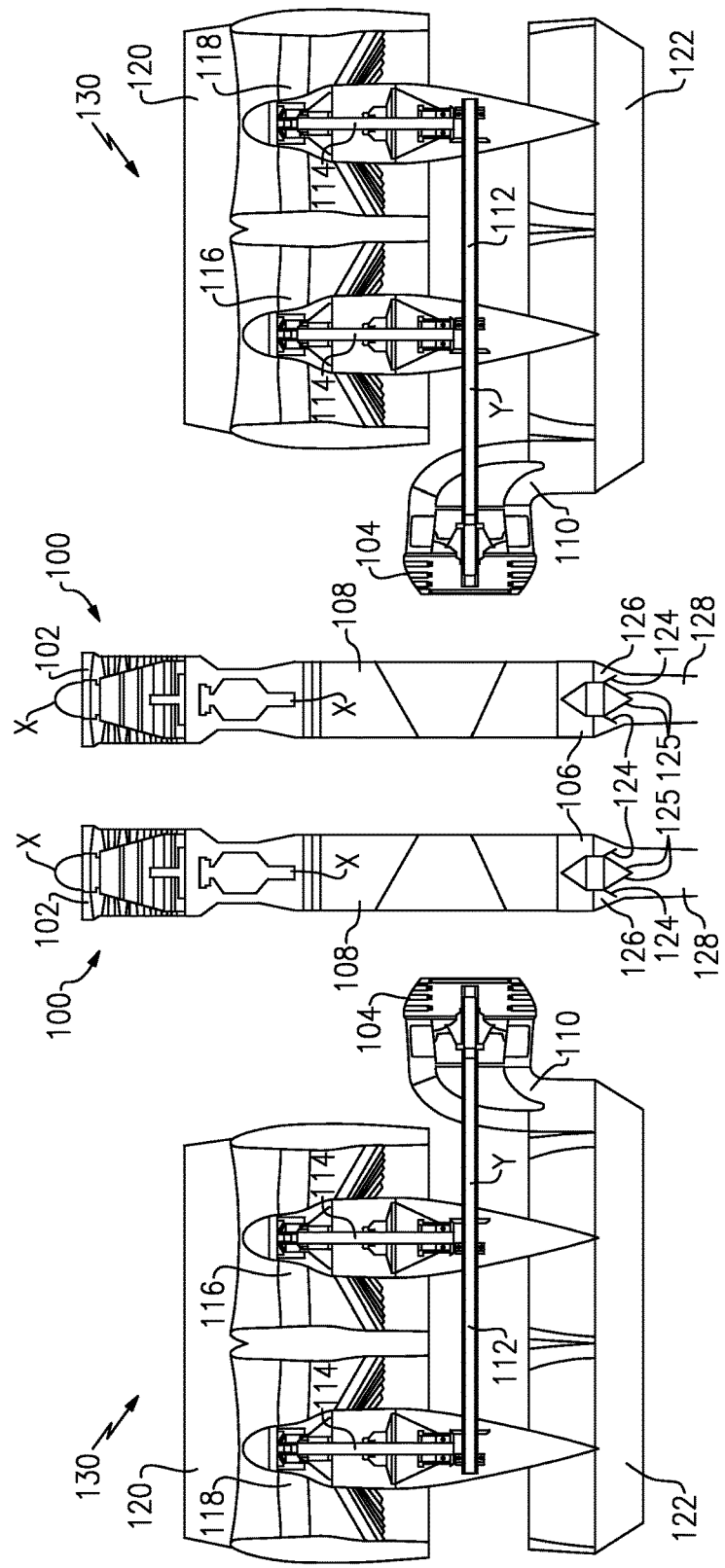
FIG. 6 shows a dual configuration of FIG. 4.

FIG. 6 shows an arrangement using the two fan sets 130 with the moveable ducts 108 oriented to engage the augmentors 106. Utilizing the two fan sets 130 in this orientation allows for supersonic or elevated speeds of travel with a higher fuel consumption than the arrangement shown in FIG. 5.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

The invention claimed is:

1. A gas turbine engine comprising:
a gas generator with at least one compressor rotor, at least one gas generator turbine rotor and a combustion section;
a duct located downstream of said gas generator, said duct including an annular outlet configured to move between a first position and a second position;
wherein in the first position, the annular outlet connects the gas generator to an inlet of a fan drive turbine positioned downstream of a path of products of combustion having passed over a surface of said at least one gas generator turbine rotor and said duct, said fan drive turbine for driving a shaft and said shaft for engaging gears to drive at least two fan rotors, wherein an axis of rotation of said fan drive turbine is transverse to a gas generator axis of rotation; and
wherein in the second position, the annular outlet connects the gas generator to an inlet of an augmentor section positioned downstream of said path of products of combustion having passed over said at least one gas generator turbine rotor and said duct.

2. The gas turbine engine as set forth in claim 1, wherein said duct is a three bearing swivel duct.

3. The gas turbine engine as set forth in claim 1, wherein said augmentor section includes at least one spray bar for injecting fuel into an exhaust stream.

4. The gas turbine engine as set forth in claim 3, wherein said augmentor section includes an igniter for igniting fuel injected into said exhaust stream.

5. The gas turbine engine as set forth in claim 1, wherein said at least two fan rotors include a variable inlet opening.

6. The gas turbine engine as set forth in claim 5, wherein said at least two fan rotors include a variable exhaust opening.

7. The gas turbine engine as set forth in claim 1, wherein said duct includes a first exit flow path when in said first position and a second exit flow path when in said second position, said first exit flow path being generally perpendicular to said second exit flow path.

8. The gas turbine engine as set forth in claim 1, wherein said gas generator includes at least two compressor rotors and at least two gas generator turbine rotors, with said fan drive turbine being positioned to be downstream of said path of said products of combustion having passed over each of said at least two gas generator turbine rotors.

9. The gas turbine engine as set forth in claim 1, wherein said axis of rotation of said gas generator is generally perpendicular to an axis of rotation of said shaft.

10. The gas turbine engine as set forth in claim 1, wherein said axis of rotation of said gas generator is generally coaxial with an axis of rotation of said at least two fan rotors.

11. The gas turbine engine of claim 1, wherein said fan drive turbine and said shaft are coaxial.

12. The gas turbine engine of claim 1, wherein said axis of rotation of said fan drive turbine is generally perpendicular to said at least two fan rotors.

* * * * *